UNITED STATES PATENT OFFICE.

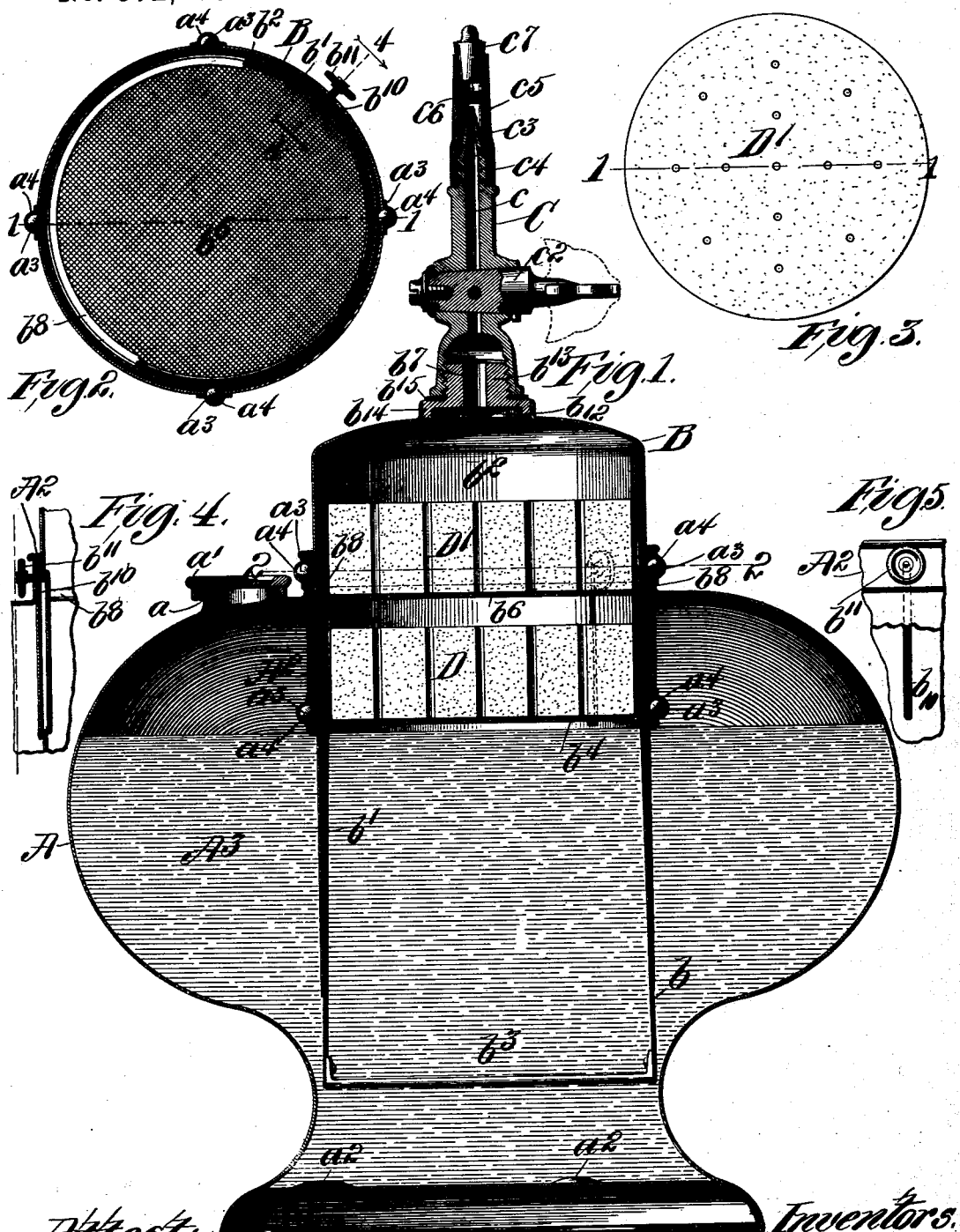

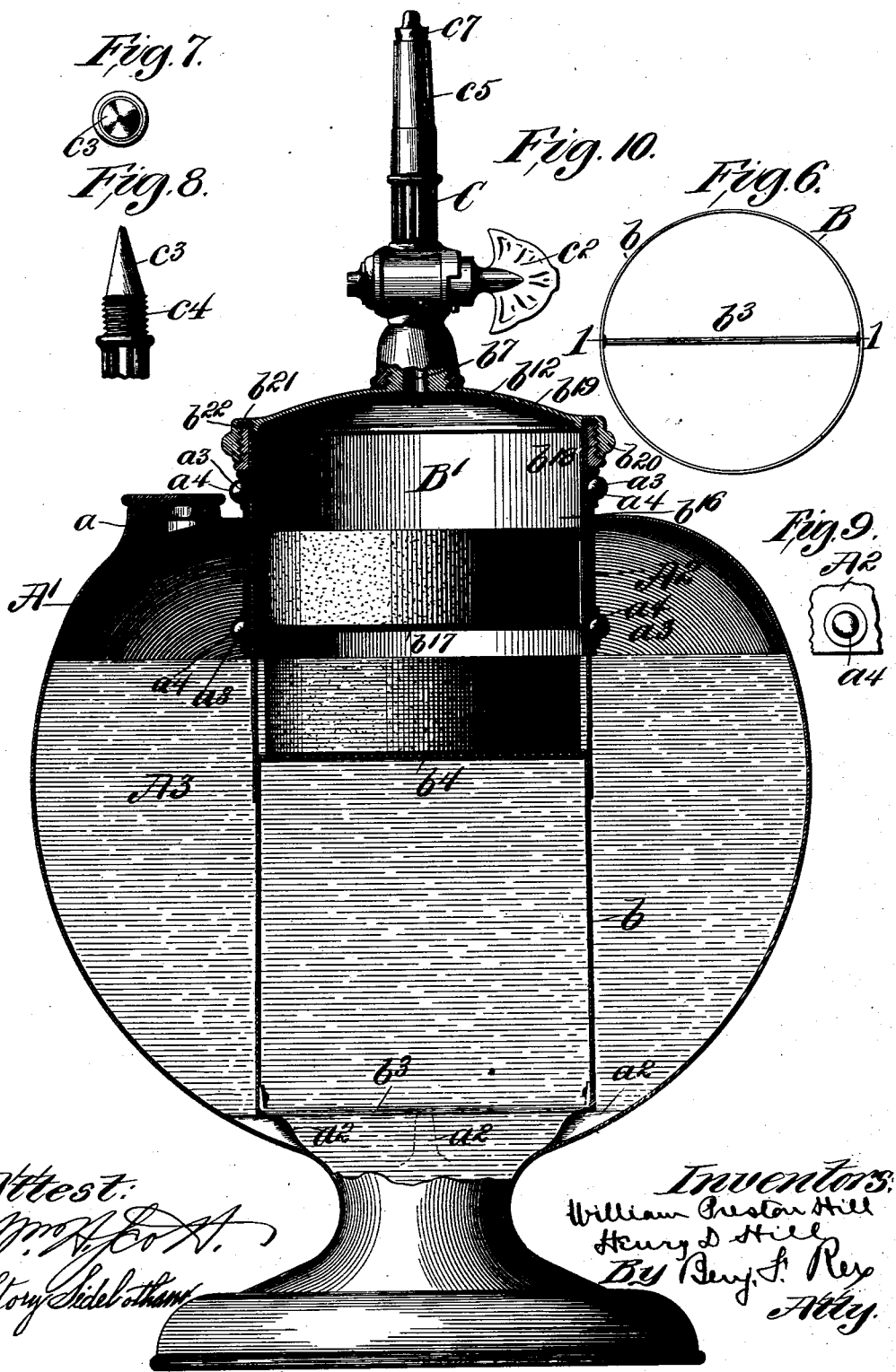

WILLIAM PRESTON HILL AND HENRY D. HILL, OF ST. LOUIS, MISSOURI.

ACETYLENE-GAS GENERATOR.

SPECIFICATION forming part of Letters Patent No. 572,113, dated December 1, 1896.

Application filed February 24, 1896. Serial No. 580,516. (No model.)

*To all whom it may concern:*

Be it known that we, WILLIAM PRESTON HILL and HENRY D. HILL, citizens of the United States, residing at St. Louis, in the State of Missouri, have invented certain new and useful Improvements in Acetylene-Gas Generators and Lamps, of which the following is a specification.

Our invention relates to improvements in means for generating from calcium carbid and drying acetylene gas and improvements in acetylene-gas lamps; and the chief objects of our improvements are, first, to provide means for automatically regulating the generation of the gas from calcium carbid and stopping its generation when no gas is being burned; second, to provide mechanism for holding the calcium carbid out of contact with water when it is desirable to do so; third, to provide means for avoiding explosions; fourth, to provide improved means for drying the gas, and, fifth, to provide an improved portable acetylene-gas lamp. We attain these objects by means and mechanism of which desirable forms are illustrated in the accompanying drawings, in which—

Figure 1 is a central vertical cross-section of a lamp embodying the preferred forms of our improvements on line 1 1, Figs. 2, 3, and 6. Fig. 2 is a horizontal cross-section on line 2 2, Fig. 1, looking from above with the cake of calcium carbid shown in Fig. 1 omitted and an annular flange shown partly broken away. Fig. 3 is a horizontal cross-section on line 2 2, Fig. 1, of the cake of calcium carbid shown in Fig. 1. Fig. 4 is a vertical section of a detail on line 4 4, Fig. 2. Fig. 5 represents the same detail in elevation with parts broken away. Fig. 6 is an inverted detailed plan view of a gas-holder. Fig. 7 is a detailed top view of a cap or stopper. Fig. 8 is a detailed view in side elevation of a portion of our improved burner. Fig. 9 is a detailed rear elevation of a socket-piece, and Fig. 10 is a central vertical section of a lamp embodying a modification of the preferred form of our gas-holder.

Similar letters refer to similar parts throughout the several views.

A, Fig. 1, and A', Fig. 10, represent water-reservoirs. Though differing slightly in shape they are in all material details identical.

$a$, Figs. 1 and 10, represents a small opening through which water may be emptied out of the reservoir. $a'$ represents a screw stopper or cap by which said opening may be closed.

$a^2$ $a^2$ $a^2$ represent rests projecting up from the bottom of the reservoirs A and A'. They are designed to support the lower end of the gas-holder hereinafter described without closing its bottom.

$A^2$, Figs. 1, 2, 4, 5, 9, and 10, represents a ring or collar attached to the reservoir and surrounding a large opening in the top thereof. Within this ring or collar said gas-holder reciprocates. The upper end of the ring preferably projects above the top of the reservoir and higher than water is intended to rise in the apparatus. Its lower end preferably extends same distance below the top of the reservoir and about to the level at which water preferably stands normally in the reservoir when the lamp is in use.

$A^3$, Figs. 1 and 10, represents water.

$a^3$ $a^3$, &c., represent rolls or balls set in sockets and projecting inward through openings in the ring $A^2$. Said sockets may be formed in any convenient way. As shown, they are each formed by attaching the flange of a concave socket-piece $a^4$ to the outside of the ring $A^2$ around one of the openings therein through which a ball is intended to project. It is desirable that the sockets in which the lower balls rest should be so formed as to prevent water from passing through them from the inside of the reservoir, but this is not essential. We prefer to use an upper and a lower set of balls, substantially as shown. Their function is to guide the gas-holder when it rises and falls, to keep said holder vertical, avoid friction, and keep an open space around the gas-holder and between it and the collar $A^2$.

B, Figs. 1, 2, and 6, represents the preferred form of what we term the "gas-holder."

The gas-holder proper is preferably composed of three parts or sections—viz., the lower section $b$, the central section $b'$, and the upper section $b^2$. The lower section $b$ is so formed as to permit water to enter at or near the bottom from the surrounding body within the reservoir. Preferably its bottom is open, as shown in Fig. 6. It may be provided with a cross-bar $b^3$ for convenience in separating it from the other sections, but this is a non-essential detail. This section preferably tapers from bottom to top, being preferably slightly larger at the bottom than the top, but this is not essential. It is provided with a support $b^4$ for calcium carbid at or near its top. This support should be high enough above the bottom of section $b$ to have its upper surface automatically elevated above the surface of the water, where, while gas is being generated, its escape from the gas-holder B is prevented. This support is preferably composed of wire-cloth or a perforated plate of suitable material. In Fig. 1 wire-cloth is represented and in Fig. 10 a perforated plate. The two are substantially the same so far as our purposes are concerned. We prefer to place this support exactly at the top of section $b$ in order to facilitate washing it, but, as will be obvious, this is not an essential detail. The walls of section $b$ should preferably extend far enough below said rest to enable the surrounding water to seal the holder and prevent gas from escaping from the bottom of the holder into the upper portion of the reservoir or out through the space between the gas-holder and the surrounding collar $A^2$ into the open air. Over the top of section $b$ the lower end of section $b'$ preferably fits. This section, like section $b$, preferably tapers slightly from its lower end upward, so as to enable it to fit the upper end of section $b$ and make a tight joint. It is provided with a support $b^6$ for a drying substance, calcium carbid being the substance preferred. This support is preferably in the shape of a piece of wire-cloth stretched across this section, preferably at its top. When stretched across the top, it is easier to wash than when lower down.

The upper section $b^2$ preferably fits down over sections $b$ and $b'$. Its sides are preferably parallel and its top is preferably closed except at the point where a passage $b^7$ is provided for the escape of gas to a burner. Within this section is preferably provided with a stop $b^8$, limiting the distance which it can pass down over the other sections. In Fig. 1 it is represented as an annular flange, but this special form is not essential, and the stop may be omitted entirely, though we consider it useful. The lower end of this section of the gas-holder preferably fits closely around section $b$, so as to make a tight joint. It preferably extends nearly but not quite to the bottom of section $b$. We prefer to cause it to terminate above the lower end of that section, so as to leave space enough to allow of the lower section being grasped with the fingers in separating the sections.

In one side of the gas-holder B a longitudinal groove $b^{10}$, Figs. 1, 2, 4, and 5, is preferably formed, and when the holder is raised high enough to elevate the calcium carbid on the support $b^4$ out of the water in the reservoir the closed upper end of this groove preferably comes opposite that portion of the collar $A^2$ extending above the top of the reservoir. Its lower end is shown closed, but may be open. This groove should extend low enough to allow the holder to rise as far above the position referred to as safety requires when the end of the screw $b^{11}$ is inserted in the groove.

The screw $b^{11}$ passes through a screw-threaded opening in the collar $A^2$, and its inner end is adapted to enter the groove $b^{10}$ when the gas-holder is elevated high enough to keep the calcium carbid on its support $b^4$ out of the water. The end of this screw does not bind the gas-holder and only interferes with its downward movement by coming in contact with the closed upper end of the groove $b^{10}$.

The screw $b^{11}$ is only inserted in the groove $b^{10}$ when the apparatus is not in use. When it is to be used, the screw is withdrawn from the groove, so as to permit the gas-holder to descend. This detail of the preferred form of our apparatus may be dispensed with, as will be obvious, but is useful.

The passage $b^7$ through the top of the upper section of the gas-holder is preferably guarded by a piece of wire-gauze $b^{12}$, which is used to prevent portions of the residuum of the slacked calcium carbid from entering the passage when the apparatus is being washed. The upper end of the passage $b^7$ is preferably surrounded by an externally-screw-threaded neck $b^{13}$, at whose base there is a shoulder $b^{14}$, upon which a gasket $b^{15}$, of rubber or its equivalent, rests.

C represents the pillar of a gas-burner. It is internally screw-threaded at the lower end and screws down over the neck $b^{13}$ of the gas-holder and by pressing upon the gasket $b^{15}$ makes a gas-tight joint.

$c$ represents a passage for gas.

$c^2$ represents a cock of ordinary construction.

$c^3$ represents a nozzle contracted internally at its tip and preferably conical within, as shown. It is, preferably, externally screw-threaded around its lower end at $c^4$.

$c^5$ represents a tube internally screw-threaded at its lower end and screwing down over the nozzle $c^3$. Its internal diameter is larger than that of the opening in the nozzle at the latter's tip.

$c^6$ represents a piece of wire-gauze which is preferably stretched across the inside of the tube $c^4$ above the tip of the nozzle $c^3$.

$c^7$ is a burner-tip. It is preferably of the common bat-wing form, but other forms may be used.

D and D', Figs. 1, 3, and 8, represent cakes of calcium carbid resting, respectively, upon the lower and upper supports $b^4$ and $b^6$. They are preferably perforated, as represented in Figs. 1 and 3, to permit water and gas to pass through them readily. These cakes are a new article of manufacture and will form the subject-matter of another application for Letters Patent of the United States which we are about to file. These cakes are not necessarily pure calcium carbid, and it is not necessary, as will be obvious, that calcium carbid should be reduced to the form of cakes before using it in my apparatus. The form in which it is represented is a convenient one, however.

In the preferred form of our apparatus the gas-holder is preferably charged as follows: The three sections $b$, $b'$, and $b^2$ being separated from each other, a cake D of calcium carbid is placed on the support $b^4$ of section $b$. The lower end of section $b'$ is then fitted over the upper end of section $b$ and another cake $D'$ of calcium carbid is placed upon the support $b^6$ of that section, and finally the upper section $b^2$ of the gas-holder is passed down over the others until its flange $b^8$ rests upon the top of the central section $b^2$ and its lower end fits tightly around the lower portion of section $b$ and makes a tight joint. The gas-holder being thus charged and the cock closing the passage leading to the tip $c^7$ of the burner being open and the reservoir A being charged with water, preferably to about the height of the lower end of the collar $A^2$, and the cap or stopper $a'$ being in place the gas-holder B is slid down through the collar $A^2$ and between the balls $a^3$ and allowed to descend into the water in the reservoir. The air within the holder escaping through the burner allows the water to enter the lower end of the gas-holder, and the gas-holder preferably sinks until the cake C of calcium carbid is immersed in water. It is prevented from sinking low enough to allow the cake $D'$ to enter the water.

As soon as the cake D begins to be acted upon by the water acetylene gas is generated. This gas rises ladened with moisture and, passing through the support $b^6$, comes in contact with the cake $D'$ of calcium carbid. This cake having a strong affinity for water dries the gas, and a portion of its carbon combining with the hydrogen of the water passes up with the gas formed below and escapes through the gas-burner. If a light is required at once, the lamp can be lighted as soon as gas begins to escape through the burner. If a light is not required immediately, the cock $c^2$ is closed. If the cock is closed and the gas thus prevented from escaping, the expansive power of the gas forces the gas-holder to rise in the water and its upper end to move upward through the ring $A^2$ until the weight of the gas-holder and contents counterbalances the expansive force of the gas. By giving the gas-holder the proper weight it can be kept from rising beyond a predetermined point under normal conditions. In case of an unusual increase of pressure the gas-holder will be forced higher and may be lifted entirely out of the holder and the gas thus allowed to escape freely into the outer air. The holder in this way acts as a safety-valve and makes an explosion impossible. The screw $b^{11}$ is retracted when the lamp is in use, so as not to interfere with the movements of the gas-holder.

When the calcium carbid with which the apparatus has been charged has become slaked, the gas-holder is removed from the apparatus, taken apart, and the residuum of the calcium carbid washed out of it. It may then be recharged in the manner above described.

We have referred to charging our apparatus with calcium carbid; but, as is well known, there are equivalent alkaline-earth carbids which act in substantially the same way and by using which acetylene gas may be generated. These substances may be used in our apparatus instead of calcium carbid, and not only they, but any other substances having a strong affinity for water may be used for drying the acetylene gas instead of the cake $D'$ of calcium carbid, which is preferably used for that purpose. So, also, the water in the gas may be dried, though not so perfectly, by passing it through a substance which extracts the water therefrom mechanically. Where we speak of a "drying substance," broadly, in our claims, we do not wish to be confined to a substance acting chemically.

In the modification of our apparatus represented in Fig. 10 the lower section $b$ of the gas-holder $B'$ is the same as the corresponding section in the preferred form of our gas-holder. The upper section $b^{16}$ differs from the central section $b'$ of the preferred form in extending to the top of the holder and in having the support $b^{17}$ placed same distance below the top for that reason, so as to leave room above it for the material to be used in drying the gas. Its lower end fits over the upper end of the lower section $b$ just as the lower end of section $b'$ does in the preferred form. It is preferably extended below the surface of the water in the reservoir at all times, so as to secure the benefit of a water seal. Its upper end is provided with an annular reinforce $b^{18}$, externally screw-threaded, and its top is closed by a cap $b^{19}$, provided with an annular downwardly-extending flange $b^{20}$, which is internally screw-threaded and screws down around the reinforce $b^{18}$. This top is also preferably provided with an annular groove $b^{21}$ on its under side, within which there is a gasket $b^{22}$, of rubber or its equivalent, with which the upper edge of the reinforce $b^{18}$ comes in contact when the cap is in place, and thus makes a tight joint. In other respects the top of this form of our gas-holder is shown the same as the preferred form. The chief difference between the two forms is in the manner of charging them with calcium carbid. In the modification the cap $b^{19}$ of section $b^{16}$ is removed and the cake $D'$ introduced through the upper end of the gas-holder. This cap is also removed in cleaning the gas-holder, and this avoids any damage of getting particles of the residuum in the gas-burner or the passage leading to it.

As will be obvious, the special forms of the different parts and the proportions of those parts may be greatly varied without departing from the essence of our invention or the essential part of the mode of operation of our apparatus, and we do not desire to be understood as confining our claims to proportions or parts shown or an apparatus embodying a gas-holder divided into sections like the forms of holders illustrated. It will also be obvious that the special joints which we prefer and have described are not the only ones that can be used. Many other forms of joints may be substituted therefor, as is well known, and we therefore do not wish to be understood as confining ourselves to the joints shown unless they are particularly specified in our claims.

We have shown our improvements applied to a portable lamp having but one burner, but, as will be obvious, the apparatus need not necessarily be portable, and the gas-holder may be connected by suitable means with any number of burners. It may, by giving it the proper proportions and charging it with the proper amount of calcium carbid or its equivalent and water, be made to supply gas to all the rooms of a house.

We call the space above the support for the cake D' in the gas-holder a "drying-chamber," though, as shown, it is only divided from the portion of the gas-holder beneath it by the support for the drying substance.

We claim—

1. The combination of a water-reservoir and a vertically-reciprocating gas-holder, whose lower end is within said reservoir; a support within and moving with the gas-holder for a solid substance, which when moistened generates gas; a support in said gas-holder above the support first mentioned upholding a gas-drying substance; said upper support being above the normal level of the water in the reservoir at all times and the upper surface of said lower support being beneath the normal surface of the water, when the gas-holder is in its lowest position and above it when the gas-holder is in its highest position, substantially as and for the purpose described.

2. The combination of a water-reservoir and a vertically-reciprocating gas-holder, extending into the reservoir and composed of two communicating sections; a lower section having an inlet for water in the lower part thereof and carrying a support for solid material, which when moistened generates gas, and a removable upper section fitting down over and removably attached to the lower section and extending below the normal level of the water in the reservoir at all times, and thus securing a water seal and having a space therein above said support, for gas, substantially as described.

3. The combination of a water-reservoir, and a vertically-reciprocating gas-holder whose lower end extends into said reservoir, and which holder has a lower part having at its lower end an opening admitting water and in its upper part a support carrying a substance which when moistened generates gas; an intermediate part whose upper end connects with the top of said lower part and contains a support carrying a gas-drying substance and a top part closing said intermediate part substantially as described.

4. The combination of a water-reservoir an opening at the top of said reservoir; a collar surrounding said opening; a gas-holder reciprocating within said collar; a support within and moving with said gas-holder for an alkaline-earth carbid; the upper surface of said support being located at a point which is above the surface of the water when the gas-holder is in its highest position and below the surface of the water when the gas-holder is in its lowest position and positive means for preventing the gas-holder from descending low enough to immerse the alkaline-earth carbid when the apparatus is out of use, but permitting it to ascend substantially as described.

WILLIAM PRESTON HILL.
HENRY D. HILL.

Witnesses:
BENJ. F. REX,
CHARLIE THAN.